United States Patent
Jesme et al.

(10) Patent No.: US 9,454,241 B2
(45) Date of Patent: Sep. 27, 2016

(54) INTERACTIVE POLARIZATION-PRESERVING PROJECTION DISPLAY

(75) Inventors: Ronald D. Jesme, Plymouth, MN (US); Craig R. Schardt, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 284 days.

(21) Appl. No.: 13/881,397

(22) PCT Filed: Oct. 28, 2011

(86) PCT No.: PCT/US2011/058215
§ 371 (c)(1),
(2), (4) Date: Apr. 25, 2013

(87) PCT Pub. No.: WO2012/064520
PCT Pub. Date: May 18, 2012

(65) Prior Publication Data
US 2013/0222237 A1    Aug. 29, 2013

Related U.S. Application Data

(60) Provisional application No. 61/412,869, filed on Nov. 12, 2010.

(51) Int. Cl.
| | | |
|---|---|---|
| G06F 3/03 | (2006.01) | |
| G06F 3/042 | (2006.01) | |
| G02B 27/28 | (2006.01) | |

(52) U.S. Cl.
CPC ........... *G06F 3/0308* (2013.01); *G06F 3/0425* (2013.01); *G02B 27/286* (2013.01)

(58) Field of Classification Search
CPC .............. G03B 21/60; G03B 21/604; G03B 27/10–27/1026; G03B 27/1046; G03B 27/14; G03B 27/142; G03B 27/148; G03B 27/149; G03B 27/283; G03B 27/286; G03B 21/56; G06F 3/03–3/0308; G06F 3/0325; G06F 3/042–3/0428; G09G 5/00–5/42; H04N 13/0434; H04N 13/0438; H04N 13/0459

USPC ....... 359/352, 359, 360, 443, 449, 451, 460, 359/487.01, 529, 530, 599; 348/141, 143, 348/162, 164, 169, 739, 744, 759, 762; 352/131, 133, 134, 135; 353/20, 28; 345/30, 32, 156; 250/336.1, 338.1, 250/339.14, 216, 225

See application file for complete search history.

(56) References Cited

U.S. PATENT DOCUMENTS

| | | | | |
|---|---|---|---|---|
| 5,751,482 A | * | 5/1998 | Challener, IV | ......... 359/485.03 |
| 7,254,288 B2 | * | 8/2007 | Kalibjian | ........................ 385/11 |

(Continued)

FOREIGN PATENT DOCUMENTS

| | | |
|---|---|---|
| JP | 2008-039925 | 2/2008 |
| WO | WO 2005/057398 | 6/2005 |

OTHER PUBLICATIONS

Bernacki et al., "Design and Fabrication of Efficient Miniature Retroreflectors for the Mid- and Long-Wave Infrared," Infrared Technology and Applications XXXIV, edited by Bjorn F. Andresen, GAbor F. Fulop, Paul R. Norton, Proc. of SPIE vol. 6940, 69400X, 2008.*

(Continued)

*Primary Examiner* — Stephone B Allen
*Assistant Examiner* — Adam W Booher
(74) *Attorney, Agent, or Firm* — Clifton F. Richardson (57) ABSTRACT

The disclosure generally relates to optical devices, such as interactive displays, and in particular to interactive projection displays having passive input devices. The present disclosure also provides a passive interactive input device having the ability to overcome problematic ambient interference signals in an interactive display, such as an interactive projection display.

22 Claims, 6 Drawing Sheets

(56) References Cited

U.S. PATENT DOCUMENTS

| | | |
|---|---|---|
| 2005/0178953 A1 | 8/2005 | Worthington |
| 2006/0033713 A1 | 2/2006 | Pryor |
| 2006/0289760 A1 | 12/2006 | Bathiche |
| 2008/0068352 A1* | 3/2008 | Worthington et al. ....... 345/175 |
| 2009/0190210 A1* | 7/2009 | Coleman et al. ............. 359/452 |
| 2013/0222892 A1 | 8/2013 | Jesme |

OTHER PUBLICATIONS

Steel, "Polarization-Preserving Retroreflectors," Applied Optics, vol. 24, No. 21, Nov. 1, 1985, pp. 3433-3434.*

* cited by examiner

INTERACTIVE POLARIZATION-PRESERVING PROJECTION DISPLAY

RELATED APPLICATION

This application is related to the following U.S. Patent Application, which is incorporated by reference: "Interactive Polarization-Selective Projection Display" Ser. No. 61/412,866, filed on an even date herewith.

BACKGROUND

Commercially available interactive projection systems, such as "Smart Boards", often use hand-held input devices to interact with the projected image. Such hand-held input devices can include active infrared, ultrasonic and/or RF transmitters and/or receivers. These input devices are used for location of the device relative to the projected image, and can also function to activate a signal to effect a change in the projected image. Such input devices can be formed, for example, in the shape of a marker or a pen.

Active input devices generally can include light generation devices, while passive devices reflect or absorb light that is produced elsewhere. Active input devices require a power source, such as an internal battery or power delivered via a connecting wire. Wired devices can be cumbersome to use, and battery powered devices require the battery to be replaced and/or recharged, making active input devices less than ideal. However, available active devices can provide clear, strong input information, whereas simple passive devices can suffer from interference with ambient signals, masking the intended input signal.

SUMMARY

The disclosure generally relates to optical devices, such as interactive displays, and in particular to interactive projection displays having passive input devices. In one aspect, the present disclosure provides an interactive display that includes a polarization-preserving screen disposed to reflect infrared (IR) light, and a visible-light image displayed on the polarization-preserving screen. The interactive display further includes a polarized IR light source capable of illuminating the polarization-preserving screen with a polarized IR light beam having a first polarization direction, a polarization analyzer disposed to intercept a reflected portion of the polarized IR light beam; and an IR sensor disposed to detect the reflected portion of the polarized IR light beam that passes through the polarization analyzer.

In another aspect, the present disclosure provides an interactive display that includes a polarization-preserving screen disposed to reflect infrared (IR) light, and a visible-light image displayed on the polarization-preserving screen. The interactive display further includes a polarized infrared (IR) light source capable of illuminating the polarization-preserving screen with a polarized IR light beam having a first polarization direction, at least one polarization analyzer disposed to intercept a reflected portion of the polarized IR light beam; and an IR sensor disposed to detect a the reflected portion of the polarized IR light beam that passes through each of the at least one polarization analyzer.

In yet another aspect, the present disclosure provides an interactive projection system that includes a polarization-preserving reflective screen and a visible-light projector configured to display an image on the polarization-preserving reflective screen. The interactive projection system still further includes a polarized infrared (IR) light source capable of illuminating the polarization-preserving reflective screen with a polarized IR light beam, a polarization analyzer disposed to intercept a reflected portion of the polarized IR light beam; and at least one IR sensor disposed to detect the reflected portion of the polarized IR light beam that passes through the polarization analyzer.

In yet another aspect, the present disclosure provides an interactive imaging system that includes a polarized infrared (IR) light source capable of illuminating a region with a polarized IR light beam, and at least one IR sensor disposed to intercept a plurality of reflected portions of the polarized IR light beam, wherein the polarized IR light beam includes IR light having a first polarization direction, and the at least one IR sensor detects IR light having a second polarization direction orthogonal to the first polarization direction.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides a passive interactive input device, referred to herein as a "marker", having the ability to overcome problematic ambient interference signals in an interactive display, such as an interactive projection display. In one particular embodiment, a passive interactive input device, or marker, is described, that together with a properly designed projection and sensing system, can overcome spurious ambient interference signals that reduce the effective interaction with the projected image.

Polarized infrared (IR) illumination and polarization controlled retroreflectors can be used to increase the robustness of passive interactive sensing. Polarization-preserving screens that are capable of reflecting and maintaining the polarization state of polarized light can further improve the sensitivity and robustness of the marker, and gestures that can be sensed from movement of the marker. Passive interactive gesture sensing can be used in parallel with image projectors, or can also be integrated into such projectors. In one particular embodiment, passive interactive gesture sensing can be integrated into small-format projectors, for example, pocket-, micro-, or pico-projectors such as the MPro series of Micro Professional Projectors, available from 3M Company.

Figure 1:
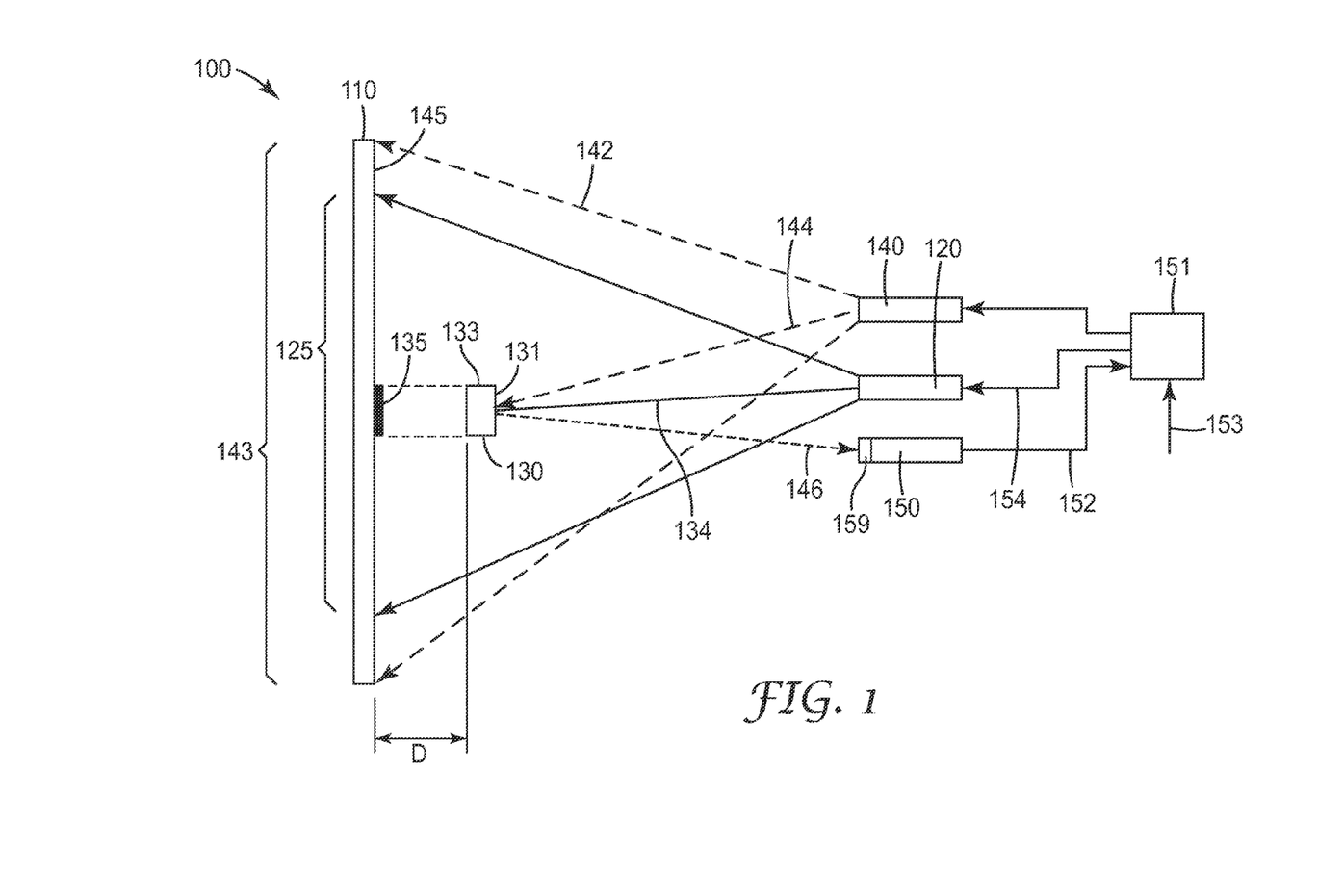
FIG. 1 shows a cross-section schematic of an interactive display.

FIG. 1 shows a cross-section schematic of an interactive display 100, according to one aspect of the disclosure. Interactive display 100 includes a projection screen 110 having a visible-light image 125 projected thereupon by an image projector 120. A polarized infrared (IR) light source 140 is disposed such that it is capable of illuminating the projection screen 110 with IR light rays 142 in an IR illuminated region 143. The IR light rays 142 are used to provide the interactivity with the image projector 120 and the visible-light image 125, as described elsewhere. In some cases, the IR illuminated region 143 can be larger than the visible-light image 125 as shown in FIG. 1, such that an IR illuminated border region 145 exists beyond the visible-light image 125. In some cases, the IR illuminated region 143 can be instead limited to a smaller region than the visible-light image 125, or in some cases, can even extend beyond the projection screen 110 (not shown).

In some cases, the polarized IR light source 140 can be one of a plurality of IR sources, each independently addressable and capable of emitting IR light having different polarization states or even different IR wavelengths, as known to one of skill in the art. Each polarized IR light source 140 can, for example, include at least one of: a polarizer that transmits one polarization state, and blocks other polarization states; or an IR filter that transmits one IR wavelength range and blocks other IR wavelengths.

In one particular embodiment, the projection screen 110 can be a polarization-preserving screen that is capable of reflecting light rays while preserving the polarization state (or direction) of the reflected light. Generally, polarization-preserving screens include screens that have a metalized reflective layer such as silver, aluminum, and the like. Any suitable polarization-preserving screen can be used, including, for example, retroreflective screens such as a half-silvered beaded screen known in the art.

Figure 2A:
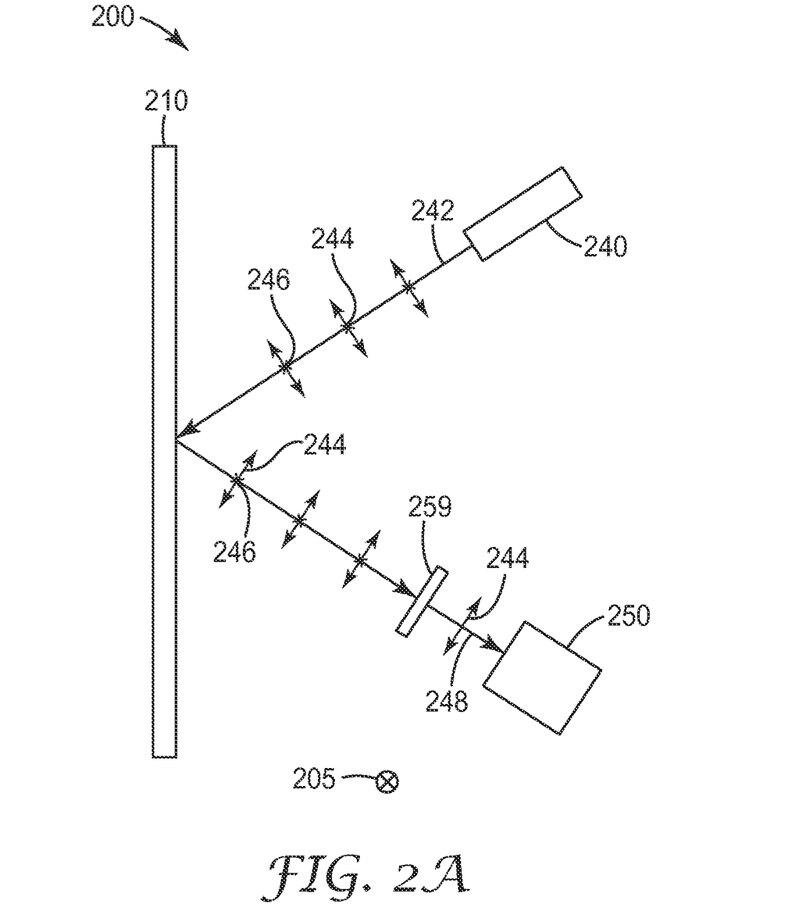
FIGS. 2A-2B show a cross-section schematic of a projection screen.

FIG. 2A shows a cross-section schematic of a projection screen 200, such as a polarization-preserving projection screen 210, according to one aspect of the disclosure. A light source 240 directs a first light ray 242 toward the polarization-preserving projection screen 210. First light ray 242 can be unpolarized light or it can be polarized light. In general, first light ray 242 can include light having a first polarization direction 244 and/or a second polarization direction 246.

In one particular embodiment, a polarization direction 205 is shown to be oriented perpendicular (that is, into the paper) to the schematic shown in FIG. 2A, and light having the second polarization direction 246 can be, for example, p-polarized light 246. In this embodiment, p-polarized light 246 is reflected from polarization-preserving projection screen 210, and s-polarized light 244 is also reflected from polarization-preserving projection screen 210. In some cases, the first and the second polarization directions can be, for example, p-polarized light and s-polarized light, respectively. In some cases, the first and the second polarization directions can be, for example, right circularly polarized light and left circularly polarized light. In some cases, the circularly polarized light can have a more general designation such as right- and left-elliptically polarized light.

A screen that reflects incident light of a first polarization with a second polarization that is well defined and deterministic is to be included in the class of polarization preserving. For example, a screen that reflects a vertically polarized incident beam with a horizontal polarization is to be considered in the class of polarization preserving screens. Other screens with any combinations of linear, circular and elliptical polarizations of incident and reflected polarizations are also in the class of polarization preserving.

Reflected s- and p-polarized light can then pass through a polarization analyzer 259. The polarization analyzer 259 can be, for example, an absorbing polarizer that selectively transmits light having a first polarization direction and absorbs light having a second orthogonal polarization direction. In some cases, the polarization analyzer 259 can be, for example, a reflecting polarizer that selectively transmits light having a first polarization direction and reflects light having a second orthogonal polarization direction. As shown in FIG. 2A, polarization analyzer 259 is aligned to the polarization direction 205 such that s-polarized light 244 passes through to intercept sensor 250 where it is detected as reflected s-polarized light 248.

Figure 2B:
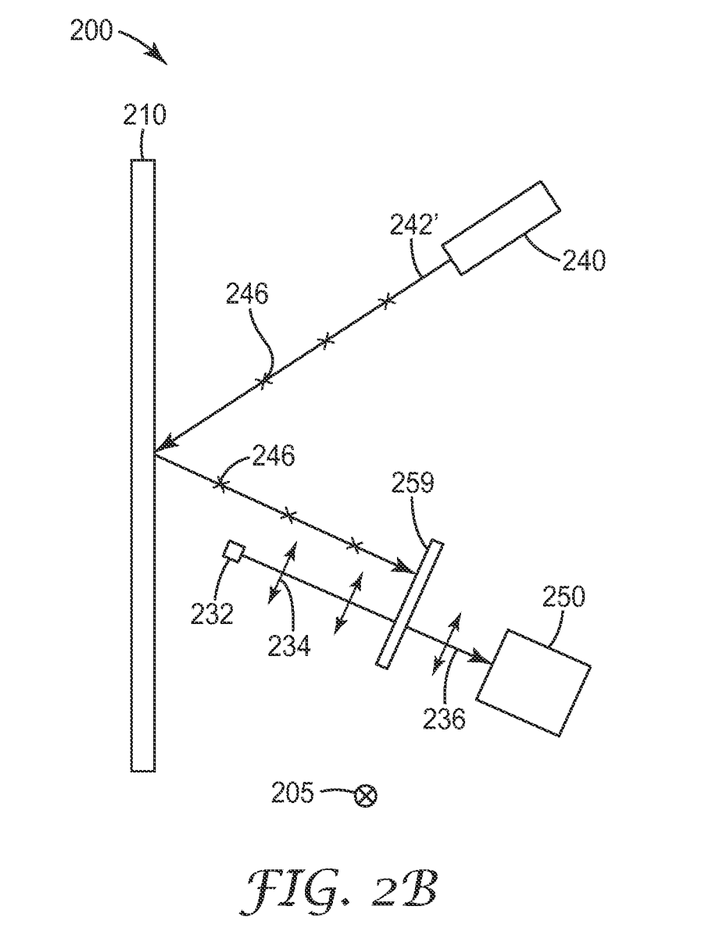

FIG. 2B shows a cross-section schematic of a projection screen 200, such as a polarization-preserving projection screen 210, according to one aspect of the disclosure. A light source 240 directs a first light ray 242' toward the polarization-preserving projection screen 210. First light ray 242' can be polarized light. In general, first light ray 242' can include light having a second polarization direction 246.

In one particular embodiment, a polarization direction 205 is shown to be oriented perpendicular (that is, into the paper) to the schematic shown in FIG. 2B, and light having the second polarization direction 246 can be, for example, p-polarized light 246. In this embodiment, p-polarized light 246 is reflected from polarization-preserving projection screen 210. In some cases, the first and the second polarization directions can be, for example, p-polarized light and s-polarized light, respectively. In some cases, the first and the second polarization directions can be, for example, right circularly polarized light and left circularly polarized light. In some cases, the circularly polarized light can have a more general designation such as right- and left-elliptically polarized light.

Reflected p-polarized light can then pass through a polarization analyzer 259. The polarization analyzer 259 can be, for example, an absorbing polarizer that selectively transmits light having a first polarization direction and absorbs light having a second orthogonal polarization direction. In some cases, the polarization analyzer 259 can be, for example, a reflecting polarizer that selectively transmits light having a first polarization direction and reflects light having a second orthogonal polarization direction. As shown in FIG. 2B, polarization analyzer 259 is aligned to the polarization direction 205 such that p-polarized light 246 does not pass through to intercept sensor 250, and is not detected.

A second light source such as a marker 232 that can be an emissive light source, or a passive light source such as a retroreflector, directs an s-polarized light 234 toward polarization analyzer 259, as described elsewhere. Since polarization analyzer 259 is aligned to the polarization direction 205, s-polarized light 234 passes through polarization analyzer 259 where it is detected as s-polarized light 236.

In some cases, polarization-preserving projection screen 210 can further include several optional layers, such as those described, for example, in U.S. Pat. No. 6,381,068 (Harada et al.). The optional layers can include, for example, an optional light diffusing layer and an optional light absorption layer. In one particular embodiment, the optional light absorption layer can be an IR absorbing layer, such that the IR light incident on the screen is absorbed and not reflected. The presence of an optional IR light absorbing layer may improve contrast in some interactive projection systems.

Returning now to FIG. 1, the interactive display 100 further includes a marker 130 that can provide the interactivity with the visible-light image 125 and the image projector 120. The marker 130 can be disposed anywhere suitable to intercept an incident IR light ray 144 emanating from the polarized IR light source 140. The marker 130 intercepts and reflects at least a portion of the incident IR light rays 142, such as the incident IR light ray 144. A reflected IR light ray 146 is then directed to a polarization analyzer 159 that transmits one polarization direction (as described above with reference to FIGS. 2A-2B). The reflected IR light ray 146 that passes through the polarization analyzer 159 is then directed to an IR sensor 150 disposed to intercept the reflected IR light ray 146. The IR sensor 150 can be, for example, an IR camera capable of intercepting IR light reflected from several positions with the IR illuminated region 143. In some cases, the IR sensor 150 can be capable of assigning a (possibly unique) position to any reflecting marker within the IR illuminated region.

As shown in FIG. 1, the marker 130 can be placed at a distance "D" from the projection screen 110, so the interaction can occur without actually being in contact with the screen. In one particular embodiment, the visible-light projector 120 can be switched to operate in a "fixed-focus" mode during the interactive functions, such that the presence of the marker 130 within the field of view (or, alternately, the presence of the user in the field of view) does not affect the focus of the visible-light image 425.

In some cases, the IR sensor 150 can be one of a plurality of IR sensors, each independently addressable and attuned to different polarization states or even different IR wavelengths, as known to one of skill in the art. Each IR sensor 150 can, for example, include at least one of: a polarizer (for example, a polarization analyzer as described above) that transmits one polarization state to the sensor, and blocks other polarization states; or an IR filter that transmits one IR wavelength range and blocks other IR wavelengths. In such cases, multiple interactive gestures may be simultaneously and/or uniquely identified on the same visible-light image, by using multiple input devices (or markers) and sensors attuned to the specific polarizations or wavelengths.

In one particular embodiment, the polarized IR light source 140 can be configured to emit light having the first polarization direction (for example, 244 in FIG. 2A), the second polarization (for example, 246 in FIG. 2A), or a combination of the first polarization direction 244 and the second polarization direction 246 (that is, elliptically polarized). In some cases, it can be preferable to configure the polarized IR light source 140 to emit only the second polarization direction, so that only the IR light rays 142 incident upon the projection screen 110 are reflected from the screen. In this case, the IR sensor 150 will not detect any IR light rays unless the marker 130 is placed to reflect IR light ray 146 and rotate the polarization direction before passing through the polarization analyzer 159 to the IR sensor 150.

The reflected IR light ray 146 is a position indicator beam that identifies the position of the marker 130 within the IR illuminated region 143 as well as an image position 135 within the visible-light image 125. In one particular embodiment, the visible-light source projects a visible-light position ray 134 onto the marker 130, which then casts a shadow of the marker 130 (that is, image position 135) on the visible-light image 125. In some cases, there can be more than one marker 130 (for example, so-called "multi-touch" interactive screens) that can be used to generate more than one image position 135 within the visible-light image 125.

The marker 130 can include a variety of reflectors having characteristics that can be used to (possibly uniquely) identify the marker 130 and the position of the marker 130 in the IR illuminated region 143. In one particular embodiment, the marker 130 can include a reflector such as a specular reflector (for example, a metalized coating or a multilayer optical film), a retroreflector (for example, a cube-corner retroreflector or a metalized beaded retroreflector), a diffuse reflector (for example, a beaded reflector), or a combination thereof. In one particular embodiment, the marker 130 can include a polarization preserving reflector (for example, a metalized beaded retroreflector), a polarization rotating reflector (for example, a metalized beaded retroreflector including a retarder in the light path), a polarization randomizing reflector (for example, a cube corner retroreflector or a beaded reflector), or a combination thereof.

In one particular embodiment, the marker 130 can include more than one type of reflector disposed on different surfaces of the marker 130 to effect different changes or modifications to the visible-light image 125 depending on the surface pointing toward the IR sensor 150. In some cases, for example, a first surface 131 of the marker 130 can include a polarization-preserving retroreflector, and a second surface 133 of the marker 130 can include a polarization-rotating retroreflector, effecting a first modification of the visible-light image 125 by positioning of the first surface 131, and a second modification of the visible-light image 125 by positioning of the second surface 133. Markers suitable for use in interactive display devices are more fully described elsewhere in the present disclosure.

Generally, the image projector 120, polarized IR light source 140, and IR sensor 150 are in communication with an image generation device 151, such as a computer. The image generation device 151 can adjust or modify the visible-light image 125 through projector signal 154 in response to a sensor activation signal 152 from the IR sensor 150. The image generation device 151 can instead adjust or modify the visible-light image 125 through projector signal 154 in response to an external activation signal 153. In one particular embodiment, the illuminating polarization state can be synchronized with the integration period of the imaging sensor, such that different illuminator polarization states can be associated with different imaging sensors, or different sensor results, as described elsewhere. The IR sensor 150 and the visible-light image 125 are aligned and/or calibrated such that there is a correspondence between the image position 135 and the position indicator beam (that is, the reflected IR light ray 146), as described elsewhere.

Both the sensor activation signal 152 and the external activation signal 153 can result from a variety of techniques including, but not limited to, an acoustic signal, an electronic signal, a visual signal, an active IR signal, a passive IR signal, or a combination thereof, as known to one of skill in the art. In some cases, for example, the sensor activation signal 152 can include either a masking of a retroreflective marker 130, or a rotation of a retroreflective marker 130, such that the retroreflector selectively reflects polarized IR light 144 to the IR sensor 150. In some cases, the status of retroreflection from the marker 130, for example either polarization preserving or polarization randomizing, can be changed by such a masking or rotation. In some cases, a passive click could be accomplished by revealing, hiding, or presenting a reflective area. This could be done, for example, by covering a retroreflector with a transmissive LCD panel. In some cases, a pattern presented on the LCD could convey (possibly unique) click information that may be interpreted by image analysis software, as known to one of skill in the art. In some cases, a retroreflector could be made to either reflect or not reflect by frustrating the total internal reflection (TIR) of the device, by techniques readily apparent to one of skill in the art. In some cases, the degree of reflectivity can be adjusted to provide an activation signal by the aforementioned techniques.

Figure 3A:
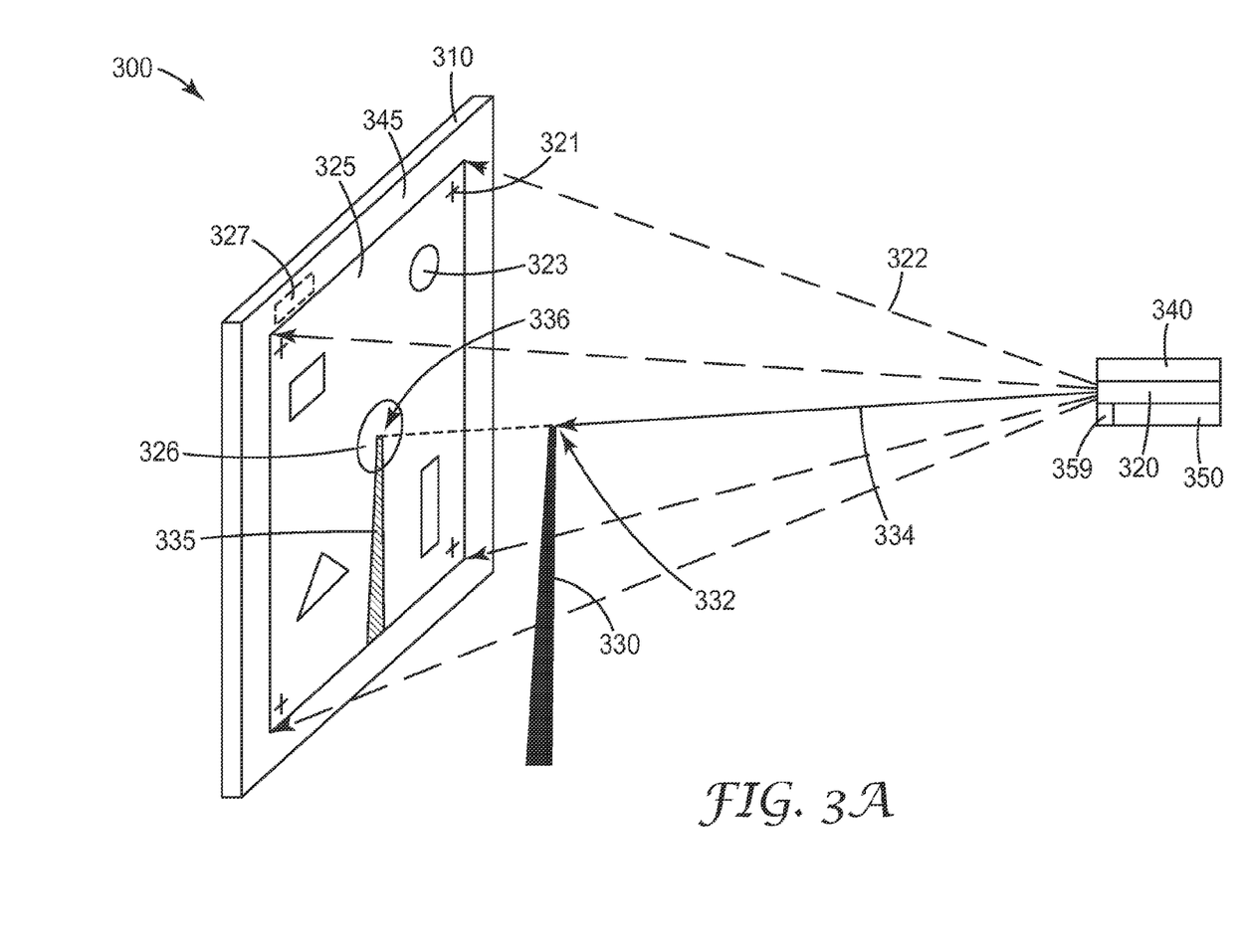
FIGS. 3A-3B show a perspective schematic of an interactive display.
Figure 3B:
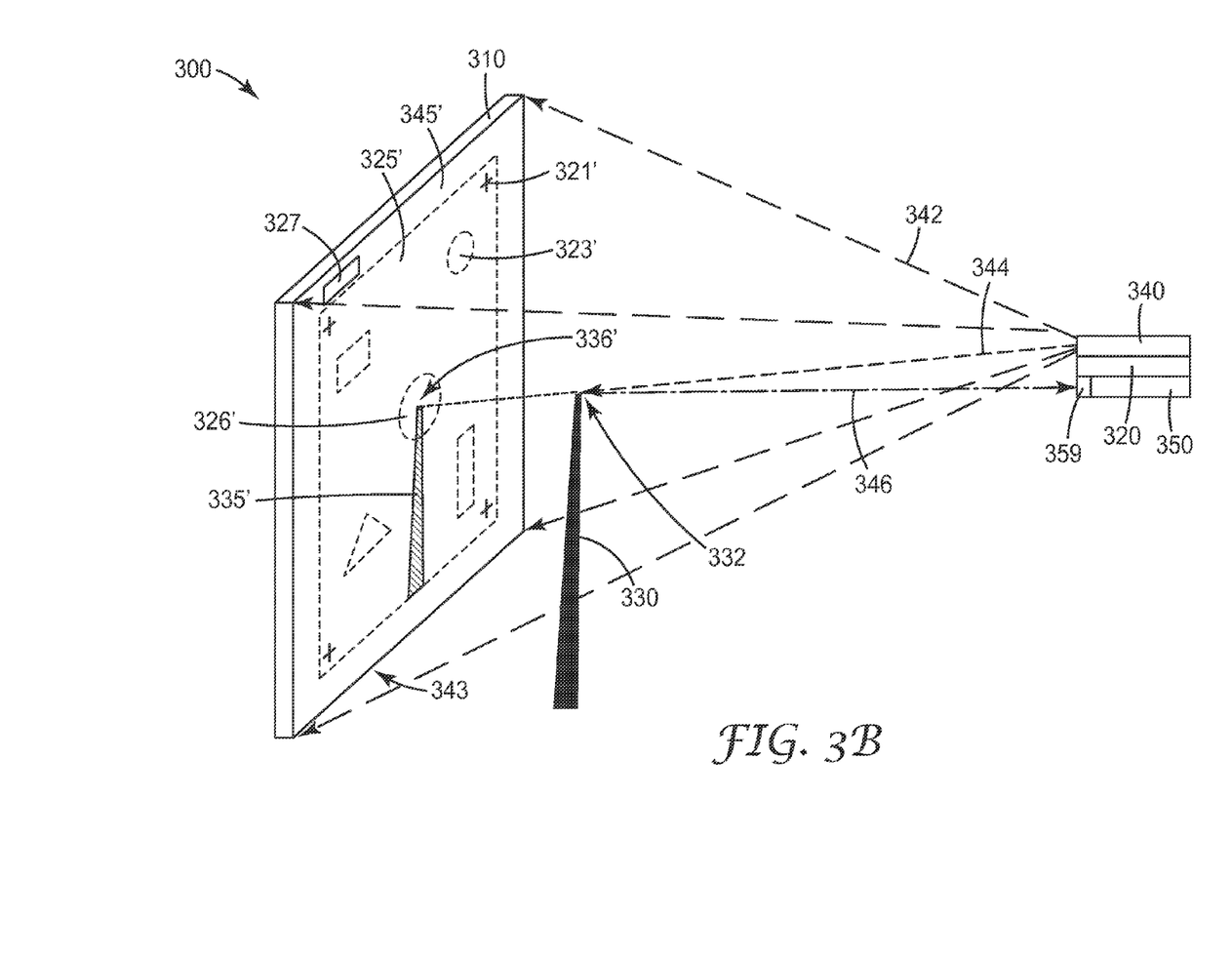

FIGS. 3A-3B shows a perspective schematic of an interactive display 300 according to one aspect of the disclosure. Each of the numbered elements 300-350 in FIGS. 3A-3B correspond to like numbered elements 100-150 presented in FIG. 1, and both the description and the function of each element are correspondingly alike. For example, projection screen 310 in FIGS. 3A-3B corresponds to projection screen 110 in FIG. 1. FIG. 3A shows the interactive display 300 illuminated by visible light source 320, whereas FIG. 3B shows the interactive display 300 illuminated by polarized IR light source 340. It is to be understood that the elements of FIGS. 3A-3B are superimposed upon each other in the interactive display 300, and have been separated into two figures merely for clarity.

FIG. 3A shows the visible-light image 325 portion of the interactive display 300. Marker 330 can have any general shape, as previously described, however in FIG. 3A, it is shown to have the shape of a pointer, with an indicator tip 332. A visible-light ray 334 from visible-light projector 320 casts a marker shadow 335 on visible light image, and includes a indicator tip shadow 336 that is positioned over a selected indicia 326 within visible-light image 325. Visible-light image 325 includes several indicia 323 located throughout, and in some cases may correspond to selection points within the image, such as buttons, sliders, dialog boxes, and the like. In some cases, the visible-light image 325 that is intercepted by the marker 330 (for example, the plurality of visible light rays 322 that intercept marker 330) can be removed such that there is no projected image on the marker 330. This can be especially beneficial if the marker 330 includes a portion of the user's body (not shown), as this projected image on the body can be a distraction to viewers of the visible-light image 325.

Also shown in visible-light image 325 are a series of fiducial marks 321 that can be used to provide a series of reference points such that the visible-light image 325 and IR illuminated region 343 (shown in FIG. 3B) are brought into alignment such that there is a correspondence between positions of the indicator tip 332 and the visible-light image 325. In one particular embodiment, activation of the indicator tip shadow 336 on each of the fiducial marks 321 can bring the visible-light image 325 and the IR illuminated region 343 into one-to-one correspondence. Also shown in FIG. 3A is a hidden indicia 327 that is positioned within border region 345 outside of visible-light image 325. The hidden indicia 327 can be invisible to the human eye, and activated by reflection of IR light from the same marker 330, as described elsewhere.

FIG. 3B shows the IR illuminated region 343 of the interactive display 300. Marker 330 can have any general shape, as previously described, however in FIG. 3B, it has the shape of a pointer, with an indicator tip 332. The position of the indicator tip 332 can be determined, for example by a computer (not shown) controlling the interactive display 300, from the pattern of reflected IR light beams 346, received by the IR sensor 350.

The images from the visible-light projector 320 are included in FIG. 3B for reference (note that the visible-light images are identified by a primed (') number that corresponds to FIG. 3A). All of the light from the polarized IR source 340 that impinges upon projection screen 310 is absorbed or transmitted, not reflected, and is not visible to the human eye. FIG. 3B includes a hidden indicia 327 that is positioned within border region 345 outside of visible-light image 325'. Hidden indicia 327 can be a region within the border region 345 (not seen by the observers, since there is no visible-light image projected in the border region) that can be used to effect additional modifications, for example, to the visible-light image 325. Such additional modifications can include, but are not limited to: master controls for the display including brightness, contrast, and the like; ability to switch between projection devices; environmental controls; conferencing controls; and the like.

Figure 4:
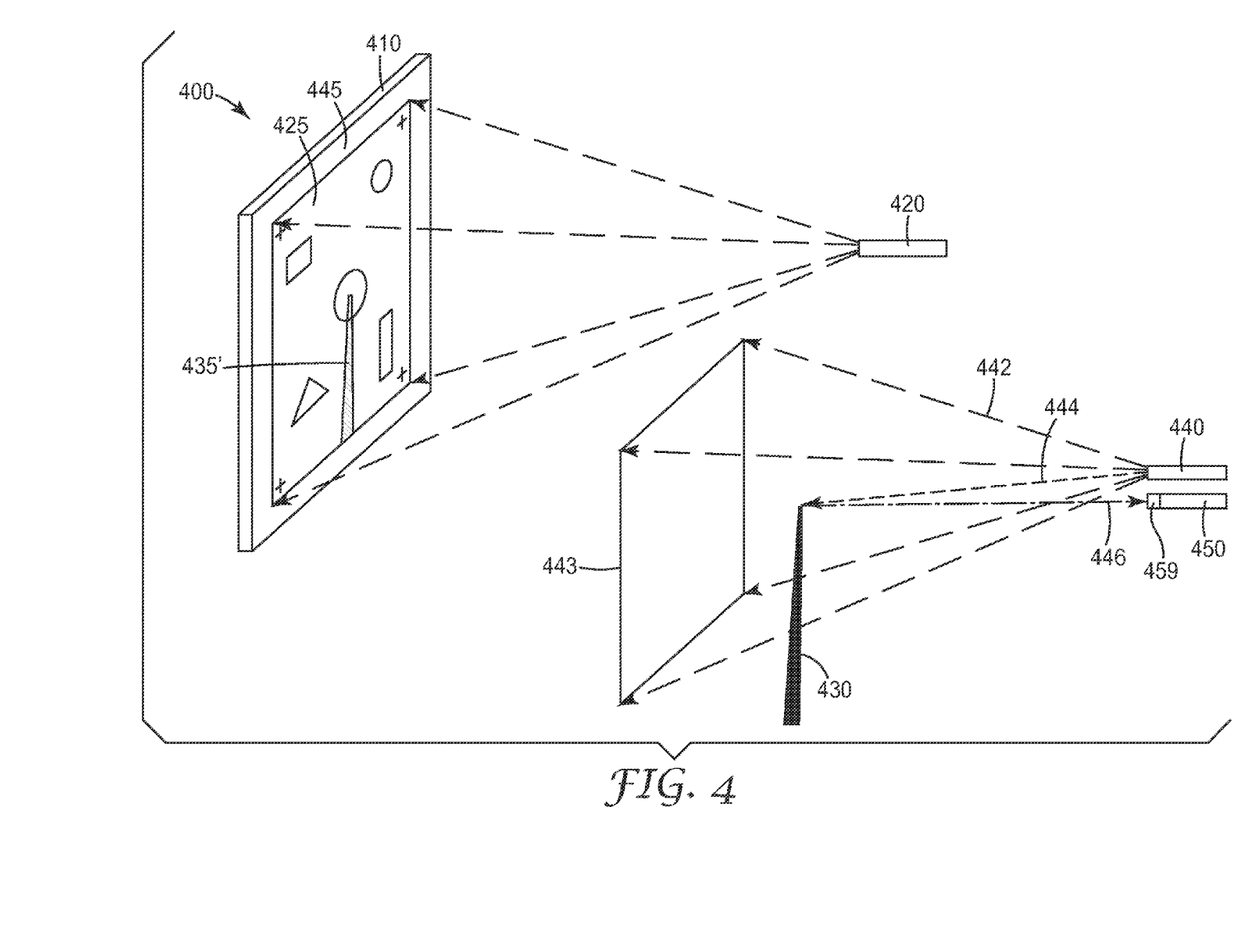
FIG. 4 shows a perspective schematic of an interactive display.

FIG. 4 shows a perspective schematic of an interactive display 400, according to one aspect of the disclosure. Each of the numbered elements 400-450 in FIG. 4 correspond to like numbered elements 100-150 presented in FIG. 1, and both the description and the function of each element are correspondingly alike. For example, projection screen 410 in FIG. 4 corresponds to projection screen 110 in FIG. 1.

In FIG. 4, the visible-light image 425 and the IR illuminated region 443 are spatially separated; that is, they are not superimposed upon each other as described previously. Spatial separation of the visible-light image 425 and the IR illuminated region 443 allows a user to remotely effect changes or modifications to the visible-light image 425 without physically being located between the image projector 420 and the polarization-preserving screen 410. This can be beneficial, for example, when using a large visible-light image 425 that is located in a position that is difficult for the user to directly access, such as an elevated projected image in a large presentation room. In this particular embodiment, a marker image 435' may be projected into the visible-light image 425, since no "shadow" is generated as described previously.

The markers used herein, which can operate by several different techniques, will now be described more fully. In some cases, a controllable retroreflector can be used as a marker for inexpensive interactive devices that does not rely on a power source such as a battery. The reflective state of the retroreflector can be controlled such that the retroreflector can be switched between active (that is, "on") and inactive (that is, "off") states. This control can be anything from a simple reflecting/non-reflecting on/off control, to more complex detection of differing reflected shapes thereby allowing for significantly more interactivity. In some cases, a film can be overlaid on the top of the device that can allow a user to interact with the presence of light projected onto the device, as opposed to interacting with the shadow cast by the device.

In one particular embodiment, the controllable retroreflectors can allow for interaction with the display by reflecting IR light back toward the light source, although any wavelength of light can be used. The controllable retroreflectors can be inexpensive interaction devices, which could be as small as a pop-cap sized device that switches the reflective state of the material. Such inexpensive interaction devices could be especially beneficial used in classrooms and developing countries, as many users could interact at once on a large screen, while keeping the cost down.

Depending on the levels of interactivity desired, the device can be made to be increasingly complex by incorporation of low power electronics and/or mechanical systems that can finely control the shape and aspect ratio of the reflected light. In some cases, a greater level of interactivity than is available with many active devices can be achieved. Such battery-free and/or low-power devices can eliminate or reduce the frequency of battery replacements compared to active devices. In developing countries and classrooms, the absence of batteries is of benefit. In some cases, a second sensor can be used to detect interaction in three dimensions, which can enable a full 6 degree-of-freedom (6DOF) interactivity. 6DOF can generally refer to movement of an object up and down, side to side, front to back, rotated with pitch, yaw, and roll.

In one particular embodiment, the controllable retroreflector may simply be flipped back and forth by hand, such that the retroreflector either faces the IR light source, or faces away from the IR light source. This switching technique can lead to difficulties with interactive accuracy (it may be difficult to point exactly where you would like to). A simple mechanical assembly for flipping the film can be devised, that allows for improved interactive accuracy. On some cases, a lens can be positioned over the retroreflector to re-direct some slight off-angle light to retroreflect toward the sensor. This can allow a much smaller piece of retroreflector to be used, and if a hemispherical lens is placed on top of the retroreflector, for example, a bright retroreflection can occur from nearly any angle of light entering the lens.

In some cases, a top film can be useful for hiding the internal mechanisms of the device, and protecting them from finger oils and dust. In some cases, the top film can be a visible light diffusing, infrared light transparent film, as known to one of skill in the art. Such a top film can permit the IR portion of the device to retroreflect, while the visible light from the projector can diffuse on the device. This arrangement can allow a user to interact with a lit object, as opposed to interacting with a shadow.

The physical shape of the device is not restricted in any way, and the device can be incorporated into, for example, a pen, a round device, a square shaped device, and the like. The activation buttons which control the retroreflection can be located anywhere convenient to the user, such as on the sides, the front, the back, or any combination of locations on the device. Location of the activation buttons on the back of the device would allow a user to push the device against a surface and control its retroreflection. In some cases, the device could be a single cube corner that has the ability to control the retroreflective properties of the device, such as adjusting one or more of the sides to prevent the device from retroreflecting, or by covering up one side of the device.

In one particular embodiment, a passive retroreflective device can include a liquid crystal display (LCD) disposed near or on the surface of the retroreflector. The LCD can control whether or not the retroreflector is exposed to illumination. In this embodiment, the activation buttons can control one of several shapes that can be displayed on the LCD screen. The sensor can be designed to be capable of detecting colors as well as shapes, and as such, the LCD could be a full color display which could offer analog control over the brightness of reflections. If the sensor can detect colors and shapes, a red shape and a green shape could be overlaid on each other allowing for more information to be transferred for every reading of the sensor. Glass bead retroreflectors can be used to preserve the polarization of the light reflecting from the surface of the retroreflector, to prevent any additional light loss due to the presence of an absorbing polarizer associated with the LCD.

In one particular embodiment, a TIR retroreflector can be frustrated (that is, frustrated TIR or FTIR) to control the reflected light shape. The activation button(s) can be used to mechanically actuate a system that allows the reflections to occur or not occur. In this manner, in addition to shape and aspect ratio, an FTIR controllable retroreflector can include reflectivity adjustment with both on/off and grayscale control, which could allow for brightness control detectable by the sensor. In some cases, an electronic system can be utilized to control FTIR, and allow the transmission of shape information and brightness. The electronic system can include, for example, electrostatically charged pigment or dye particles that are electrophoretically moved into and out of the evanescent region associated with TIR (thereby frustrating the TIR), as known to one of skill in the art.

In one particular embodiment, a mechanical system can be used to obscure the retroreflector, selectively allowing desired regions of the retroreflector to reflect. A simple iris can be fabricated that permits reflection when a mechanical lever is actuated, for example, by moving an opaque film, door, louvers, and the like, that control the transmission of light.

In one particular embodiment, the sensor can be located near the screen, to allow for greater resolution including a third-dimension sensing of distance from the screen. In this embodiment, polarization diffusing/retaining retroreflectors can be used, for example, to determine the location of a user's fingers in relation to one another, and a computer can be used to determine the angular position of the hand. This can enable a great amount of interactivity in a very natural way (for example, hand movements) while not obstructing the natural movements of the users. The polarization/non-polarization of the emitted light can permit the differentiation of polarization retaining and polarization diffusing retroreflectors. In some embodiments, the retroreflector does not need to be controlled, as the Z axis (normal to the screen) can be used to actuate an interaction (for example, if the retroreflector is more than twelve inches away from the surface, ignore the movements of the hand). In some cases, the polarized 3D sensing system can include two or more zoom lenses to assist in determination of relative distances.

Following are a list of embodiments of the present disclosure.

Item 1 is an interactive display, comprising: a polarization-preserving screen disposed to reflect infrared (IR) light; a visible-light image displayed on the polarization-preserving screen; a polarized IR light source capable of illuminating the polarization-preserving screen with a polarized IR light beam having a first polarization direction; a polarization analyzer disposed to intercept a reflected portion of the polarized IR light beam; and an IR sensor disposed to detect the reflected portion of the polarized IR light beam that passes through the polarization analyzer.

Item 2 is the interactive display of item 1, further comprising a marker disposed to reflect a portion of the polarized IR light beam as a position indicator beam.

Item 3 is the interactive display of item 1 or item 2, wherein the IR sensor and the visible-light image are aligned and/or calibrated such that there is a correspondence between the position indicator beam and a region of the visible-light image.

Item 4 is the interactive display of item 1 to item 3, wherein the correspondence is a one-to-one correspondence.

Item 5 is the interactive display of item 1 to item 4, wherein the polarization analyzer is aligned to transmit a second polarization direction orthogonal to the first polarization direction.

Item 6 is the interactive display of item 1 to item 5, wherein the IR sensor detects the reflected portion of the polarized light beam having a second polarization direction orthogonal to the first polarization direction.

Item 7 is the interactive display of item 2 to item 6, wherein the marker comprises a retroreflector.

Item 8 is the interactive display of item 7, wherein the retroreflector comprises a polarization preserving retroreflector.

Item 9 is the interactive display of item 7, wherein the retroreflector comprises a polarization rotating retroreflector.

Item 10 is the interactive display of item 2 to item 9, wherein the position indicator beam comprises mixed polarization states.

Item 11 is the interactive display of item 2 to item 10, wherein the marker comprises a diffuse reflector.

Item 12 is the interactive display of item 11, wherein the diffuse reflector comprises a finger.

Item 13 is the interactive display of item 1 to item 12, wherein the IR sensor is sensitive to IR light having the first polarization direction only, the second polarization direction only, or a mixture of the first polarization direction and the second polarization direction.

Item 14 is the interactive display of item 1 to item 13, wherein the polarized IR light source illuminates at least one of the visible-light image and a border region exterior to the visible-light image.

Item 15 is the interactive display of item 14, further comprising an activation signal capable of updating the visible-light image based on a state of the activation signal.

Item 16 is the interactive display of item 14 or item 15, wherein the state of the activation signal is changed by activation within the visible-light image.

Item 17 is the interactive display of item 15 or item 16, wherein the state of the activation signal is changed by activation within the border region.

Item 18 is the interactive display of item 15 to item 17, wherein the activation signal comprises an acoustic signal, an electronic signal, a visual signal, an active IR signal, a passive IR signal, or a combination thereof.

Item 19 is an interactive display, comprising: a polarization-preserving screen disposed to reflect infrared (IR) light; a visible-light image displayed on the polarization-preserving screen; a polarized infrared (IR) light source capable of illuminating the polarization-preserving screen with a polarized IR light beam having a first polarization direction; at least one polarization analyzer disposed to intercept a reflected portion of the polarized IR light beam; and an IR sensor disposed to detect a the reflected portion of the polarized IR light beam that passes through each of the at least one polarization analyzer.

Item 20 is the interactive display of item 19, further comprising a plurality of markers disposed to reflect a portion of the polarized IR light beam as a plurality of position indicator beams.

Item 21 is the interactive display of item 19 or item 20, wherein each IR sensor and the visible-light image are aligned and/or calibrated such that there is a correspondence between each of the position indicator beams and a region of the visible-light image.

Item 22 is the interactive display of item 19 to item 21, wherein the correspondence comprises a one-to-one correspondence.

Item 23 is the interactive display of item 20 to item 22, wherein the plurality of markers comprise diffuse reflectors, specular reflectors, retroreflectors, polarization preserving retroreflectors, polarization rotating retroreflectors, or a combination thereof.

Item 24 is the interactive display of item 19 to item 23, wherein the at least one IR sensor further comprises a polarization analyzer, an optical wavelength filter, or a combination thereof.

Item 25 is an interactive projection system, comprising: a polarization-preserving reflective screen; a visible-light projector configured to display an image on the polarization-preserving reflective screen; a polarized infrared (IR) light source capable of illuminating the polarization-preserving reflective screen with a polarized IR light beam; a polarization analyzer disposed to intercept a reflected portion of the polarized IR light beam; and at least one IR sensor disposed to detect the reflected portion of the polarized IR light beam that passes through the polarization analyzer.

Item 26 is the interactive projection system of item 25, further comprising a plurality of markers disposed to reflect a portion of the polarized IR light beam as a plurality of position indicator beams.

Item 27 is the interactive projection system of item 25 or item 26 wherein each IR sensor and the image are aligned and/or calibrated such that there is a correspondence between each of the position indicator beams and a region of the image.

Item 28 is the interactive projection system of item 27, wherein the correspondence comprises a one-to-one correspondence.

Item 29 is an interactive imaging system, comprising: a polarized infrared (IR) light source capable of illuminating a region with a polarized IR light beam; and at least one IR sensor disposed to intercept a plurality of reflected portions of the polarized IR light beam, wherein the polarized IR light beam comprises IR light having a first polarization direction, and the at least one IR sensor detects IR light having a second polarization direction orthogonal to the first polarization direction.

Item 30 is the interactive imaging system of item 29, further comprising a plurality of markers disposed to reflect a portion of the polarized IR light beam as a plurality of position indicator beams.

Item 31 is the interactive imaging system of item 29 or item 30, wherein each IR sensor and a visible-light image are aligned and/or calibrated such that there is a correspondence between each of the position indicator beams and a position on the visible-light image.

Item 32 is the interactive imaging system of item 31, wherein the correspondence comprises a one-to-one correspondence.

Item 33 is the interactive imaging system of item 31 or item 32, wherein the visible-light image comprises a flat panel display or a projected image.

EXAMPLES

Example 1

Interactive Display with Polarization Selective Screen

An interactive display can include a projector with a visible output. The visible output can be projected onto a polarization-preserving reflective screen. IR light can illuminate the polarization-preserving screen with p-polarized IR light that is not visible to humans. The p-polarized IR light can be created with an IR light emitting diode (LED) and a polarizing film, such as a reflective polarizer, an absorbing polarizer, and the like. The reflective polarizer film can be any known reflective polarizer such as a MacNeille polarizer, a wire grid polarizer, a multilayer optical film polarizer, or a circular polarizer such as a cholesteric liquid crystal polarizer. An IR sensor, such as an IR sensing camera that can detect the location of bright IR spots is pointed at the polarization-preserving screen. The IR sensor can be adapted from a Nintendo® "Wii" remote or a web cam with digital signal processing (DSP). A second polarizing film is positioned over the IR sensor and aligned such that p-polarized light reflected from the polarization-preserving screen is not detected by the sensor. Visible light is blocked from the IR sensor using appropriate filters, and a marker is positioned within the visible-light projected image. The marker can be a retroreflector such as cube-corner retroreflectors or partially silvered glass bead retroreflectors available from, for example, 3M Company. A quarter-wave retarder can be positioned over the retroreflector, such that the polarization direction of light passing through the retarder, reflecting from the retroreflector, and passing through the retarder again, is rotated by 90 degrees; that is, the p-polarized IR light retroreflected by the marker becomes s-polarized IR light that can be detected by the IR sensor. The position of the marker appears as bright IR spots as IR light is reflected to the IR sensor. In this Example, the visible emitting, IR emitting, and IR receiving apertures are approximately co-located.

A visible keyboard is projected onto the polarization-preserving screen. The IR camera does not sense the visible image, making it immune to the projected image. The polarization-preserving screen is also flooded with IR light. The illuminating IR light is reflected by the polarization-preserving screen, and is not transmitted through the polarization analyzer. Thus, the IR camera does not sense IR illumination that falls directly on the screen. Unwanted ambient interfering IR illumination that strikes the polarization-preserving screen is generally reduced by a factor of 2, because only one polarized component of ambient IR light, reaches the IR camera. In some cases, a screen that absorbs both polarizations of IR light and reflects only visible light can be designed, as known to one of skill in the art, and the IR camera would detect no reflections from the screen. The IR sensor detects a generally dark field without bright IR spots when no retroreflectors are positioned within the IR flooded region. When a retroreflector is positioned near the screen at a projected key, the IR sensor detects the retro reflector as a bright IR spot at the location of that key and this is interpreted as a stroke to that key. When other objects are placed in the field, they are generally not sensed because they generally produce specular reflections, or diffuse reflection of different polarizations (that is, not retroreflection), resulting in little IR illumination being redirected toward the IR sensor.

In some cases, a polarization preserving retroreflector (for example, silvered glass beads instead of retroreflective cube corners) can be used. Such polarization preserving retroreflectors are particularly useful when used with a vertically polarized filter on the IR camera. This arrangement can result in unique marker identification, providing additional discrimination from objects generally encountered.

Example 2

Interactive Display without Polarization-Preserving Screen

The same configuration as provided in Example 1 is used, but the polarization-preserving screen is replaced by a diffusing screen, such as a diffuse wall surface. Additionally, polarization preserving retroreflective markers are used, as described in Example 1.

A visible keyboard is projected onto a diffuse wall. The IR camera does not sense the visible image, making it immune to the projected image. The image field on the wall is also flooded with IR light. The illuminating IR light is largely diffusely reflected by the wall, and the diffusely reflected IR light has mixed polarization states, which causes the IR camera to sense little IR illumination. Any unwanted ambient IR illumination is generally reduced by a factor of 2, because of the polarization analyzer positioned over the IR camera. Thus, the IR sensor detects a generally dark field without bright IR spots. A retroreflector is positioned near the screen over a projected key, and the IR sensor detects the retro reflector as a bright IR spot at that location. This action is interpreted as a keystroke to that key. A polarization preserving retroreflector will produce a brighter signal than that of a generic reflector/retroreflector with reflections having mixed polarization states.

Example 3

Interactive Display with Dual Retroreflective Markers

The same configuration as provided in Example 2 is used, but an additional IR illuminator floods the polarization-preserving screen with horizontally polarized light. The two IR illumination sources can be independently activated as desired. In some cases it may be useful to rapidly alternate between various IR illumination states. The states may include only vertically polarized IR illumination, only horizontally polarized IR illumination, simultaneous horizontal and vertical IR illumination, and no intentional IR illumination. It may be useful to rapidly sequence though a number of IR illumination states to enable a sensing speed that is perceived as essentially instantaneous or simultaneous. Each of several sensors can include polarization analyzers that are oriented to different polarization directions, such that each sensor detects a signal only when a retroreflector directs a reflected IR beam having the appropriate polarization direction toward the sensor. Sensors may have a sensing time or integration period that can be associated with an illumination time of a selected IR illuminator, such that different sensor/illuminator/marker combinations can be the activating signal. The effectiveness of the sensing system can be expanded by synchronization of the timing of the various illumination states to coincide with the timing of the sensor integration periods.

A visible keyboard is projected onto a diffuse wall. The IR camera does not sense the visible image, making it immune to the projected image. The image field on the wall is also flooded with IR light from the two IR sources having orthogonal polarizations. The illuminating IR light is largely diffusely reflected by the wall, with mixed polarization, which causes the IR camera to sense little IR illumination. Any unwanted ambient interfering IR illumination is generally reduced by a factor of 2, because of the vertically polarized filter over the IR camera. Thus the IR sensor detects a generally dark field without bright IR spots. A polarization preserving retroreflector can be positioned near the screen, and the IR sensor detects this retroreflector as a bright IR spot when illuminated with the vertically polarized light. However, the IR sensor does not detect the retroreflector, when illuminated with only the horizontally polarized light. A retroreflector that is not polarization preserving can be positioned near the screen, and the IR sensor detects this retroreflector as a bright IR spot when illuminated with the vertically polarized light, and also as a bright IR spot when illuminated with the horizontally polarized light. As described in this Example, it is possible to detect and distinguish two different types of retroreflectors placed within the IR illumination region. This discrimination can be used to signal a "right click" and a "left click", as common with a computer mouse.

Example 4

Interactive Display with Diffuse Reflector Markers

The same configuration as provided in Example 1 is used.

A visible keyboard is projected onto the polarization-preserving screen. The IR camera does not sense the visible image, making it immune to the projected visible image. The polarization-preserving screen is also flooded with IR light. The illuminating IR light is reflected by the polarization-preserving screen, and is not transmitted through the polarization analyzer. Thus, the IR camera does not sense IR illumination that falls directly on the screen. Unwanted ambient interfering IR illumination that strikes the polarization-preserving screen is generally reduced by a factor of 2, because only one polarized component of ambient IR light, reaches the IR camera. In some cases, a screen that absorbs both polarizations of IR light and reflects only visible light can be designed, as known to one of skill in the art, and the IR camera would detect no reflections from the screen. The IR sensor detects a generally dark field; however, when objects (such a user's hands) are placed in the IR illuminated region to gesture, they generally produce diffuse reflection with mixed polarization states. The portions of the reflection with vertical polarization components can be sensed by the IR camera as a bright image against a dark screen background. This image can then be further processed to interpret the intended gestures. In some cases, the projected visible image could be altered to be dark in the areas where an object is detected, thereby preventing an image from being projected onto, for example, the user's hands. Conversely, in some cases it may desirable to project an image specifically on an object such as a user's hand, to provide an augmented view of the hand, superimposing an image of veins, text, etc onto the user's hand, or other portions of a body.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An interactive display, comprising:
a polarization-preserving screen disposed to reflect infrared (IR) light;
a visible-light image displayed on the polarization-preserving screen;
a polarized IR light source capable of illuminating the polarization-preserving screen with a polarized IR light beam having a first polarization direction;
a polarization analyzer disposed to intercept a reflected portion of the polarized IR light beam; and
an IR sensor disposed to detect the reflected portion of the polarized IR light beam that passes through the polarization analyzer,
wherein the polarization-preserving screen is a front projection screen and is polarization-preserving for IR light.

2. The interactive display of claim 1, further comprising a marker disposed to reflect a portion of the polarized IR light beam as a position indicator beam.

3. The interactive display of claim 2, wherein the IR sensor and the visible-light image are aligned and/or calibrated such that there is a correspondence between the position indicator beam and a region of the visible-light image.

4. The interactive display of claim 1, wherein the polarization analyzer is aligned to transmit a second polarization direction orthogonal to the first polarization direction.

5. The interactive display of claim 1, wherein the IR sensor detects the reflected portion of the polarized light beam having a second polarization direction orthogonal to the first polarization direction.

6. The interactive display of claim 1, further comprising a marker disposed to reflect a portion of the polarized IR light beam as a position indicator beam, wherein the marker comprises a retroreflector.

7. The interactive display of claim 6, wherein the retroreflector comprises a polarization preserving retroreflector.

8. The interactive display of claim 6, wherein the retroreflector comprises a polarization rotating retroreflector.

9. The interactive display of claim 1, further comprising a marker disposed to reflect a portion of the polarized IR light beam as a position indicator beam, wherein the position indicator beam comprises mixed polarization states.

10. The interactive display of claim 1, further comprising a marker disposed to reflect a portion of the polarized IR light beam as a position indicator beam, wherein the marker comprises a diffuse reflector.

11. The interactive display of claim 1, wherein the IR sensor is sensitive to IR light having the first polarization direction only, the second polarization direction only, or a mixture of the first polarization direction and the second polarization direction.

12. The interactive display of claim 1, wherein the polarized IR light source illuminates at least one of the visible-light image and a border region exterior to the visible-light image.

13. The interactive display of claim 12, further comprising an activation signal capable of updating the visible-light image based on a state of the activation signal.

14. The interactive display of claim 13, wherein the activation signal comprises an acoustic signal, an electronic signal, a visual signal, an active IR signal, a passive IR signal, or a combination thereof.

15. An interactive display, comprising:
a polarization-preserving screen disposed to reflect infrared (IR) light;
a visible-light image displayed on the polarization-preserving screen;
a polarized infrared (IR) light source capable of illuminating the polarization-preserving screen with a polarized IR light beam having a first polarization direction;
at least one polarization analyzer disposed to intercept a reflected portion of the polarized IR light beam; and an IR sensor disposed to detect the reflected portion of the polarized IR light beam that passes through each of the at least one polarization analyzer, wherein the polarization-preserving screen is a front projection screen and is polarization-Preserving for IR light.

16. The interactive display of claim 15, further comprising a plurality of markers disposed to reflect a portion of the polarized IR light beam as a plurality of position indicator beams.

17. The interactive display of claim 16, wherein the plurality of markers comprise diffuse reflectors, specular reflectors, retroreflectors, polarization preserving retroreflectors, polarization rotating retroreflectors, or a combination thereof.

18. An interactive projection system, comprising:
a polarization-preserving reflective screen;
a visible-light projector configured to display an image on the polarization-preserving reflective screen;
a polarized infrared (IR) light source capable of illuminating the polarization-preserving reflective screen with a polarized IR light beam;
a polarization analyzer disposed to intercept a reflected portion of the polarized IR light beam; and
at least one IR sensor disposed to detect the reflected portion of the polarized IR light beam that passes through the polarization analyzer,
wherein the polarization-preserving reflective screen is a front projection screen and is polarization-preserving for IR light.

19. The interactive projection system of claim 18, further comprising a plurality of markers disposed to reflect a portion of the polarized IR light beam as a plurality of position indicator beams.

20. An interactive imaging system, comprising:
a polarization-preserving reflective screen;
a polarized infrared (IR) light source capable of illuminating a region of the polarization-preserving reflective screen with a polarized IR light beam; and
at least one IR sensor disposed to intercept a plurality of reflected portions of the polarized IR light beam,
wherein the polarized IR light beam comprises IR light having a first polarization direction, and the at least one IR sensor detects IR light having a second polarization direction orthogonal to the first polarization direction
wherein the polarization-preserving reflective screen is a front projection screen and is polarization-preserving for IR light.

21. The interactive imaging system of claim 20, further comprising a plurality of markers disposed to reflect a portion of the polarized IR light beam as a plurality of position indicator beams.

22. The interactive imaging system of claim 21, wherein each IR sensor and a visible-light image are aligned and/or calibrated such that there is a correspondence between each of the plurality of position indicator beams and a position on the visible-light image.

* * * * *

UNITED STATES PATENT AND TRADEMARK OFFICE
CERTIFICATE OF CORRECTION

| | | |
|---|---|---|
| PATENT NO. | : 9,454,241 B2 | Page 1 of 1 |
| APPLICATION NO. | : 13/881397 | |
| DATED | : September 27, 2016 | |
| INVENTOR(S) | : Ronald Jesme | |

It is certified that error appears in the above-identified patent and that said Letters Patent is hereby corrected as shown below:

In the Claims

Column 17
Line 5, Claim 15, delete "polarization-Preserving" and insert -- polarization-preserving --, therefor.

Signed and Sealed this
Twenty-third Day of May, 2017

Michelle K. Lee
*Director of the United States Patent and Trademark Office*